United States Patent [19]

Lawhorne

[11] 4,227,934
[45] Oct. 14, 1980

[54] USE OF ION EXCHANGE RESINS IN PREPARATION OF HIGH SOLID TIO$_2$ SLURRIES

[75] Inventor: Earl R. Lawhorne, Savannah, Ga.

[73] Assignee: American Cyanamid Company, Stamford, Conn.

[21] Appl. No.: 35,665

[22] Filed: May 3, 1979

[51] Int. Cl.$^2$ ............................................. C09C 1/36
[52] U.S. Cl. .............................. 106/300; 106/308 M; 106/308 N
[58] Field of Search ............. 106/300, 308 N, 308 M; 423/70

[56] References Cited

U.S. PATENT DOCUMENTS

| | | | |
|---|---|---|---|
| 3,063,807 | 11/1962 | Kenworthy | 423/70 |
| 3,758,322 | 9/1973 | Roberts et al. | 106/300 |
| 4,036,652 | 7/1977 | Rothmayer | 106/308 N |

*Primary Examiner*—Helen M. McCarthy
*Attorney, Agent, or Firm*—Bruce F. Jacobs

[57] ABSTRACT

Titanium dioxide pigment slurries containing above 50 percent titanium dioxide are reduced in viscosity by treatment with an anion exchange resin.

8 Claims, No Drawings

USE OF ION EXCHANGE RESINS IN PREPARATION OF HIGH SOLID TiO₂ SLURRIES

The invention relates to a method of reducing the slurry viscosity of titanium dioxide slurries by treating the slurry with an anion exchange resin.

Titanium dioxide slurries have been prepared by placing the dry finished pigment in water with an appropriate dispersant. U.S. Pat. No. 3,536,510 describes high solids content anatase slurries in which dry milled anatase $TiO_2$ is dispersed in water using appropriate dispersants, preferably alkanolamines. U.S. Pat. No. 3,758,322 describes high solids slurries in which grit-free deflocculated, nonhydrous oxide treated $TiO_2$ is used to make rutile slurries, using an appropriate dispersant. German Pat. No. 1,908,611 relates to high solids content rutile $TiO_2$ water mixtures dispersed with sodium polyphosphates.

However the slurries may be prepared when the solids level is increased above about 50 percent by weight, the viscosity of the resultant slurry becomes high thereby increasing the amount of energy needed to pump the slurry. Accordingly it is an object of the present invention to reduce the viscosity of such slurries so that they are more readily pumpable and more easily screened.

U.S. Pat. No. 3,063,807 discloses the treatment of titanium dioxide slurries with both a cationic and anionic ion exchange resin in series to remove unwanted ions adhering to the titanium dioxide, i.e. purification reactions. The highest solids content slurry treated in this patent is 50 percent by weight. While the patent does treat such a slurry with an anion exchange resin first and then a cation exchange resin, at the 50% solids level there is essentially no change in slurry viscosity. This is demonstrated by the Example IV below. Accordingly even if the patent had stopped after the anion exchange resin treatment, the present invention would not have been recognized.

In accordance with the present invention there are provided high solids pigment slurries of titanium dioxide of greatly reduced viscosity as compared to untreated slurries.

Titanium dioxide is at present the premier white pigment of commerce. It is generally produced by either hydrolyzing an aqueous solution of a titanium salt, such as a sulfate, and calcining the hydrolysate at 750°–1000° C., or oxidizing a titanium halide, e.g. titanium tetrachloride, at elevated temperatures of 800° C. or higher, followed by cooling to a temperature below 600° C. The product resulting from the calcination or oxidation contains a substantial amount of over-sized, gritty $TiO_2$ particles which are broken up by either wet or dry grinding. Drying, following the wet grinding, frequently causes cementation of agglomerates requiring a further milling treatment before a smooth textured pigment product can be obtained. In the dry milling operation, suspending agents and dispersing aids are often introduced during the milling to facilitate the reduction of the pigment to fine, uniform-sized particles. An effective means for dry grinding is a fluid energy mill in which the pigment particles are conveyed by a gaseous fluid, such as air or steam, into the outer portion of an inwardly spiraling vortex at high velocity and in a manner which will maintain the vortex at a high rotative speed and relatively low inward speed whereby the pigment aggregates may be fractured.

The starting titanium dioxide material for use in the present invention may be obtained by either the "chloride process" or the "sulfate process." Preferably, the combustion or calcination, depending upon the process, is performed in the presence of an aluminum salt such as aluminum chloride such as to "burn in" up to about 2% by weight aluminum oxide into the titanium dioxide. This material exits the reactor or calciner and is mixed with water to form a raw slurry having about 15–30% by weight solids which contains a substantial amount of oversized gritty $TiO_2$ particles which are then broken up by grinding in such as sand mills. Either this slurry or one prepared from dry finished pigment may be used in the present invention.

Except for the calciner discharge slurry which has low solids, the slurries treated herein have solids contents of above about 50% by weight, preferably about 60–80% and most preferably 65–75%.

In either case, the slurry or the make-up water going into the slurry is treated in accordance with the present invention by contacting with an anion exchange resin. The contacting may be performed by any suitable manner.

The anion exchange resins applicable in the present invention are those in the hydroxyl form. These anion exchange resins are well-known in the art, i.e. U.S. Pat. No. 2,366,007 and others. They are commercially available from a variety of sources. They may be of the gel type or the macroreticular type. Preferably the resin contains quaternary ammonium functionality. Examples of suitable ones include IRA-910, IRA-400, IRA-458, and IRA-938 (Rohm and Haas Co.); Ionac A-544 and A-641 (Ionac Chemical Corp.); Rexyn 201 (OH) (Fischer Scientific Co.); and Dowex 1-X8 and 2-X8 (Dow Chemical Co.). These are all strong basic type exchange resins.

The treatment of the slurry or make-up water with the anion exchange resin may be performed by (i) adding the resin to the slurry or make-up water or (ii) passing the slurry through a bed of the resin in a column. The contacting is performed at an appropriate temperature so as to not deteriorate the resin and for a suitable time period to reduce the resultant slurry viscosity. In view of the fact that ion exchange resin capacity varies according to type, it is difficult to define the amounts of resin to be used per amount of slurry or make-up water, but these amounts are all within the conventional ranges recommended by the manufacturers of such resins. When the active sites of the resin are saturated, the exhausted resin is no longer suitable for ion exchange purposes and must be regenerated according to standard procedures.

The following non-limiting examples are offered to further illustrate the present invention.

EXAMPLE I

An anatase slurry was prepared by dispersing 500 grams of dry titanium dioxide in a mixture of 195 grams of water and 5 grams of 2-amino-1-methylpropanol dispersant. The viscosity of the control slurry was determined using a Brookfield Model RV Viscosimeter with a No. 3 spindle.

To the above slurry was then added fifty grams of Amberlite IRA-400 ion exchange resin in (OH) form. The excess water was removed by blotting. The slurry and resin were thoroughly mixed by stirring for a few minutes and the resin beads were removed by passing the slurry through a 100 mesh U.S. standard screen. The viscosity was then determined as above. The results were:

TABLE I

| Spindle Speed rpm | Viscosity of Control, cps | Viscosity of Treated Slurry, cps |
|---|---|---|
| 10 | 10,100 | 300 |
| 20 | 5,400 | 200 |
| 50 | 2,560 | 160 |
| 100 | 1,500 | 130 |

A control slurry was prepared as in Example I but having 73.1% solids.

200 grams of Amberlite IRA-400 ion exchange resin beads were first dried by blotting the excess water with filter paper and then added to 2000 grams of the control slurry. The resin was separated as in Example I.

The following measurements were made on both slurries:

TABLE II

| Property | Control Slurry | Treated Slurry |
|---|---|---|
| Viscosity (No. 3 Spindle) | | |
| 10 | 4,800 cps | 1100 cps |
| 20 | 2,675 cps | 625 cps |
| 50 | 1,270 cps | 320 cps |
| 100 | 745 | 200 cps |
| Screening Time[1] | 2 min. 40 sec. | 1 min. 20 sec. |
| Screening Time[2] | 28.02 | 56.26 |
| +325 Mesh Screen Residue on TiO$_2$ Solids Basis | 1.322% | 1.176% |

[1] Time necessary to screen 1400 g. of slurry through a three inch diameter +325 mesh screen being vibrated by a mechanical vibrator.
[2] Determined by: pounds of slurry/square foot/minute.

EXAMPLE III

Rutile titanium dioxide was prepared through the calcination step. The resultant slurry is conventionally subjected to milling by continuous flow through sand mills with relatively low solids content (about 30% by weight) to control flocculation which would otherwise cause the sand to be pushed out of the sand mills. To perform the laboratory test of this example, instead of the above, the following was done:

1,500 ml. of the calciner discharge slurry was mixed with 4,000 grams of 20–30 mesh Ottawa C-190 sand in a one gallon jar mill. The mill was then rolled for 30 minutes and emptied onto a 50 mesh screen. About 400 ml of slurry slurry was recovered.

A further portion of 2,000 ml of the same calciner discharge slurry was mixed with 100 grams of Amberlite IRA-400 ion exchange resin in (OH) form as in Example I and the resin separated by means of a 100 mesh screen. 1500 Ml. of the treated slurry was then mixed with 4000 grams of the sand as was the control. Upon emptying the jar, the slurry flowed easily through the sand and more than 1,000 ml of slurry was recovered.

The viscosities of the samples using a No. 2 spindle on the Brookfield Viscosimeter at 50 rpm were:

| Control | Treated Sample |
|---|---|
| 152 cps | 12 cps |

EXAMPLE IV

To determine whether U.S. Pat. No. 3,063,807 could have found the unexpected viscosity control of the present invention if only an anion exchange resin were used on a 50% solids slurry the following tests were conducted:

(a) Three slurries were prepared at 30, 50 and 70% solids from rutile titanium dioxide, water, and 2-amino-1-methylpropanol as a dispersing agent. The viscosity of each slurry was determined as in Example I.

Each slurry was then treated with 10% by weight, based upon the solids content, of Amberlite IRA-910 anion exchange resin as in Example II, including the dewatering step. The solids contents were reduced slightly by the water in the resin beads which could not be removed. The viscosity of each slurry was determined as for the controls.

The results were:

| Control Slurries | | | Treated Slurries | | |
|---|---|---|---|---|---|
| | Viscosity, cps | | | Viscosity, cps | |
| % Solids | 50 rpm | 100 rpm | % Solids | 50 rpm | 100 rpm |
| 30.2 | 12 | 18 | 29.3 | 13 | 20 |
| 50 | 33 | 38 | 48.1 | 19 | 27.5 |
| 70.2 | 2500 | 640 | 67.2 | 500 | 120 |

(b) The procedure of (a) above was repeated at the 40, 50, 60 and 70% solids levels, except that separate slurries were prepared for controls and for the treatment with the anion exchange resin since the resin was added to the make-up water prior to incorporating the titanium dioxide.

The results were:

| Control Slurries | | | Treated Slurries | | |
|---|---|---|---|---|---|
| | Viscosity, cps | | | Viscosity, cps | |
| % Solids | 50 rpm | 100 rpm | % Solids | 50 rpm | 100 rpm |
| 39.8 | 14 | 19.5 | 38.3 | 13 | 21 |
| 49.7 | 28 | 36 | 47.2 | 16 | 25 |
| 59.7 | 81 | 77.5 | 56.9 | 34 | 41 |
| 69.8 | 332 | 208 | 67.0 | 60 | 70 |

As can be seen from the results at a 50% solids level or below, the use of an anion exchange resin has no, or only a slight, effect upon the viscosity of the resultant slurry. When the solids content is above about 50%, and especially when it reaches at least 60%, the viscosity is greatly reduced by at least about one-half but generally to a much greater extent.

What is claimed is:

1. A method of reducing the viscosity of a titanium dioxide pigment slurry having more than about 50 percent by weight solids comprising contacting said slurry with an anion exchange resin.

2. The method of claim 1 wherein the slurry being contacted contains about 60 to 80 percent by weight solids.

3. The method of claim 1 wherein the contacting is performed by passing the slurry through a bed of anion exchange resin.

4. The method of claim 1 wherein the contacting is performed by (i) mixing the anion exchange resin into said slurry for a time sufficient to reduce the viscosity thereof and (ii) separating the resin from the slurry.

5. A method of reducing the viscosity of a calciner discharge slurry of titanium dioxide comprising contacting said slurry with an anion exchange resin.

6. The method of claims 1 or 5 wherein the anion exchange resin is of the gel type.

7. The method of claims 1 or 5 wherein the anion exchange resin is of the macroreticular type.

8. The method of claims 1 or 5 wherein the anion exchange resin contains quaternary ammonium functionlity.

* * * * *